United States Patent [19]

Karla

[11] Patent Number: 4,618,088
[45] Date of Patent: Oct. 21, 1986

[54] PROCESS FOR SOLDERING A CURRENT CONNECTING ELEMENT AND A CURRENT FEED CONDUCTOR OF A HEATABLE GLASS PANE

[75] Inventor: Heinz Karla, Herzogenrath, Fed. Rep. of Germany

[73] Assignee: Saint Gobain Vitrage, Courbevoie, France

[21] Appl. No.: 679,170

[22] Filed: Dec. 7, 1984

[30] Foreign Application Priority Data

Dec. 13, 1983 [DE] Fed. Rep. of Germany ....... 3344958

[51] Int. Cl.$^4$ ............................ B23K 1/19; B23K 1/20
[52] U.S. Cl. .................................. 228/124; 228/106; 228/203; 219/203; 219/522; 219/543
[58] Field of Search ............... 220/203, 206, 124, 207; 156/663, 667; 219/203, 522, 543; 338/309

[56] References Cited

U.S. PATENT DOCUMENTS

| | | | |
|---|---|---|---|
| 3,271,851 | 9/1966 | Hays ..................................... | 228/205 |
| 3,734,698 | 5/1973 | Postupack ............................ | 219/203 |
| 3,874,069 | 4/1975 | Ingleby ................................ | 228/124 |
| 3,895,218 | 7/1975 | Cooke .................................. | 219/203 |
| 4,055,458 | 10/1977 | Niederprum ........................ | 156/663 |
| 4,388,522 | 6/1983 | Boaz .................................... | 219/203 |
| 4,453,669 | 6/1984 | Karla et al. ......................... | 219/203 |
| 4,475,682 | 10/1984 | Coyle .................................. | 228/125 |
| 4,525,250 | 6/1985 | Fahrmbacher-Lutz ............. | 156/667 |

FOREIGN PATENT DOCUMENTS 0070771 1/1983 France .

Primary Examiner—Kenneth J. Ramsey
Assistant Examiner—Christopher L. McKee
Attorney, Agent, or Firm—Pennie & Edmonds

[57] ABSTRACT

A process for improving the solderability of a layer of a silver frit burnt onto a glass pane and a current connecting element wherein a layer of enamel is disposed and the surface of soldering and the glass pane. According to the process the surface is treated with a fluorine containing etching agent prior to soldering. The fluorine containing etching agent may be an aqueous solution of an acid fluoride, such as ammonium hydrogen fluoride or alkali hydrogen fluoride.

6 Claims, 2 Drawing Figures

4,618,088

PROCESS FOR SOLDERING A CURRENT CONNECTING ELEMENT AND A CURRENT FEED CONDUCTOR OF A HEATABLE GLASS PANE

DESCRIPTION

Technical Field

The invention relates to a process for electrically connecting, by soldering, a current connecting element and a current feed conductor of an electrically heatable glass pane. The current feed conductor may be in the form of an enamel-like electrically conductive layer burnt onto a surface of the glass pane.

BACKGROUND OF THE INVENTION

It is known that there are difficulties in soldering a current connecting element onto a current feed conductor of an electrically heatable glass pane under circumstances that an enamel-like layer is disposed betwen the glass pane and the current feed conductor. The difficulty is compounded when the enamel-like layer is formed of an opaque enamel material (hereafter "opaque layer").

The prior art, as represented by U.S. Pat. No. 4,453,669, has addressed this difficulty in the soldering of electrical components. To this end, the patent describes that the opaque layer may be disposed on the glass pane in a manner to provide a window, whereby the printing paste of the electrically conductive layer forming the current feed conductor will be disposed on and adhere to both the opaque layer and on the glass pane after penetrating through the window. Thus, the electrical connection directly between the current connecting element and the current feed conductor is completed in the region of the window, immediately above the glass pane.

It is considered, however, that the technique described by the patent militates, somewhat, the purpose of the opaque layer. Particularly, a function of the opaque layer is to mask the electrical connection of the electrically heatable window from the outside and thereby improve the overall aesthetics of the window. In the built-in state of the electrically heatable window disclosed in the patent, the region of the electrical connection is in a discontinuity in the mask and visible through the window.

SUMMARY OF THE INVENTION

The invention is in a process for electrically connecting, by soldering, a current connecting element and a current feed conductor of an electrically heatable glass pane within a region on the surface of an opaque layer which comprises an additional burnt in layer of enamel carried directly by a glass pane. Particularly, a foot portion of the current connecting element is solder connected to the burnt in printing paste of the electrically conductive layer forming the current feed conductor following treatment of the electrically conductive layer at the region of the connection. The treatment is that of treating the region with a fluorine containing etching agent.

In a more specific aspect of the invention, the fluorine containing etching solution may be an aqueous solution of an acid fluoride, such as alkali hydrogen fluoride and ammonium hydrogen fluoride. The alkali may be calcium or potassium.

According to the process, the glass phase on the surface of the electrically conducting burnt in layer is superficially dissolved by the fluorine containing etching agent. The treatment, thus, exposes the particles of the metal phase. Generally, the metal particulate is silver.

The heat treatment associated with the melting on and burning in of ceramic pastes applied according to known processes apparently creates a coating of a vitreous phase which forms on the surface of the upper layer. In the structure described the upper layer comprises the electrically conducting layer forming the current feed conductor. The coating of the vitreous phase renders soldering difficult. The coating of the vitreous phase probably develops or is a result of low melting glass fluxes from the glass phase diffusing into the electrically conducting layer in the layer disposed below the layer to be soldered to the current connecting element. To this end, the composition of the layer to be soldered changes. The change in the layer is in the increase of the portion of the low melting glass phase. This change creates a situation that the free metal particles necessary for wetting through the soft solder are either partially or entirely surrounded by the glass phase.

The treatment of the surface to be soldered reestablishes to the full extent the characteristics of the surface of the burnt in frit so that an electrical connection may be created through the current connecting element that is soldered to the current feed conductor.

The above and other advantages of the invention will become clear as the description, to be read in conjunction with a consideration of the drawing, continues.

BEST MODE FOR CARRYING OUT THE INVENTION

Figure 1:
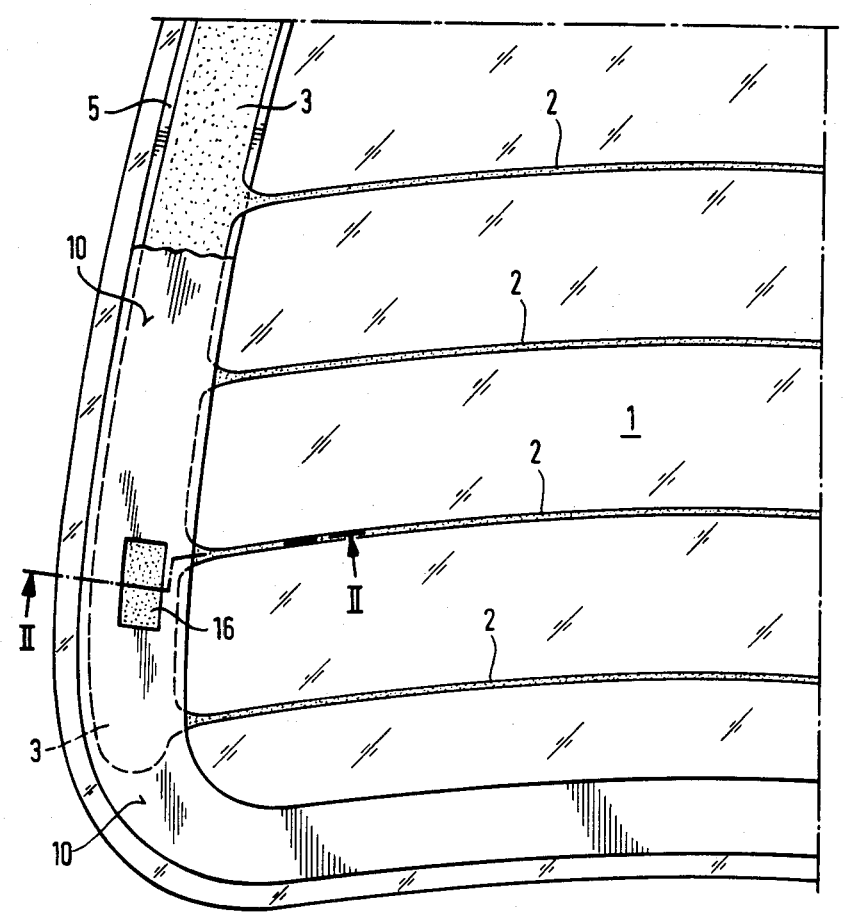
FIG. 1 is a view in elevation of a portion of an electrically heatable glass pane, having parts broken away and others removed for the sake of clarity.

Referring to FIG. 1, there is illustrated a portion of a glass pane 1 capable of use as an electrically heatable glass pane of a vehicle. Typically, the glass pane of the general type described herein will find use as a rear window.

A family of heating conductors 2, in the form of narrow, parallel strips, is disposed across the glass pane, and each heating conductor will have substantially equal spacing. Typically, the family will include a number of heating conductors required to provide a source of heat throughout the area of the window. However, the family will be limited in total number of heating conductors, so as not to obscure the viewing area of the window. According to the invention each heating conductor will have a width of about 0.4 to 1.2 mm.

The heating conductors are located horizontally across the window, and a pair of current feed conductors 3 are located adjacent opposite sides of the window to provide a collective conductor into which the ends of each heating conductor extend. The current feed conductors are relatively wide as compared to the width of a heating conductor. The heating conductors 2 and the current feed conductors 3 are located on the inner surface (facing the passenger compartment) of glass pane 1. Both the heating conductors and the current feed conductors are formed of an electrically conductive enamel-like material disposed as a layer on the glass pane.

Figure 2:
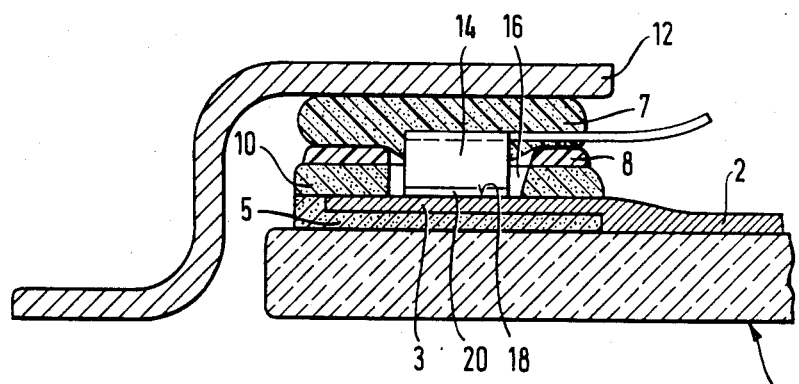
FIG. 2 is a view in section as seen along the line II—II of FIG. 1, and further illustrating an electrical connection.

Referring to both FIGS. 1 and 2, a layer 5 may be seen in a disposition along the edges of the glass pane 1. The layer 5 is formed of an opaque material and serves the function of masking the current feed conductors 3 and other structures to be described along the vertical sides of the glass pane 1. The layer is continuous throughout the remainder of the perimeter of the glass pane to provide a complete frame, having a uniform edge to provide a neat appearance for the viewing area. The layer 5, as a rule, will be located to the glass pane prior to assembly, for example, by gluing of the glass pane within the window frame of the body of the vehicle. Thus, the layer 5 also will prevent the possibility that the area of gluing may be seen by looking through the glass pane.

The layer 5 may be formed of a ceramic burning-in material as may be obtained in the marketplace. Preferably, the layer may comprise a black ceramic material.

A layer 10 which serves as a protective or isolative layer is disposed on each current feed conductor 3. Thus the current feed conductors are substantially enveloped by the layers 5 and 10 along their top, bottom and along the side opposite the side into which the heating conductors extend. The layer 10 is formed of a burnt-in ceramic material, and, preferably, the layer 10 will comprise a composition like that of layer 5.

The layer 10 has been characterized as a "protective or isolative layer". To this end, the layer 10 isolates the current feed conductors 3 from superimposed structure, and thus protects the current feed conductors from any deleterious action caused by an incompatibility of materials from which the current feed conductors and the superimposed structure are formed. Referring to FIG. 2, the superimposed structure includes a coating of adhesive 7 and primary layer 8 which is applied prior to the application of the adhesive to secure the window in place to a flange 12 of the window frame of the body of the vehicle. The layer 10, as illustrated, is disposed between the adhesive 7 and current feed conductor 3, and serves as a surface for application of the primary layer. The layer 10 militates against the incompatibility of the materials, an incompatibility which would effect the adhesion capabiltiy of the materials, and permits a strong adhesive bond between the flange 12 and the window.

The layer 10 is provided with a recess or window 16 at a location along the length of each current feed conductor 3. Each window provides an access opening to the current feed conductors for completing the electrical connection to a source of power through a current connecting element 14. The location of the window 16 will be taken into consideration during the printing of layer 10 so that the region of the window will remain free of ceramic printing paste. The printing of the layer 10, as well as the layer 5 and conductive elements 2, 3 may be carried out following known techniques, such as a silk screening process.

The electrical circuit is to be completed by soldering a current connecting element 14 directly to each current feed conductor 3. This connection, by soldering, follows the steps of burning-in the several layers of enamel heretofore described.

According to the invention a surface 18 of each current feed conductor 3 is treated with a fluorine containing etching solution. The etching solution is an aqueous solution of an acid fluoride, such as an alkali hydrogen fluoride or an ammonium hydrogen fluoride. According to a specific aspect of the invention, an approximately 10% solution of ammonium hydrogen fluoride in water may be used as an etching solution. The etching solution may be absorbed by a stamp or other instrumentality (not shown, but of well known structure and absorbance) and applied in a thin layer to surface 18 of the current feed conductors 3. The surface will be the exposed surface within the confines of window 16 of layer 10. The surface 18 is etched after a short action time of a few seconds. As previously indicated, the etching process exposes the particles of the metal phase of the current feed conductors 3 so that that surface 18 may be completely wetted by the molten solder in electrically attaching a foot part or base 20 of the current connecting elements 14. The process has provided a good electrical connection, by soldering, without any further treatment and without the need to clean surface 18 of etching solution and any reaction products. In fact, the electrical connection, by soldering, has provided a result equivalent to the result of an electrical solder connection obtained when the current feed conductor 3 having the same compositon is affixed directly to the surface of a glass pane.

The invention has been described in the environment of an electrically heatable window for a vehicle. Another application of the invention may be in the creation of an electrical connection to a burnt in antenna conductor carried by a glass pane wherein the electrical connection is completed at a location behind a frame of burnt in color, such as the layer 5. In addition, the invention may be used with other glass panes in the case of which electrical conductors of electrically conducting frits have melted on the surface. These compounds generally contain a low melting glass component and a metallic component, and, in a manner as previously discussed, the soldering surface will be disposed on and behind a frame of burnt in color, such as the layer 5.

I claim:

1. A process for soldering a current connecting element to an enamel-like, electrically conducting layer burnt onto a surface of a glass pane, said electrically conducting layer being disposed on an enamel-like layer which is, in turn, located between the surface of the glass pane and the electrically conducting layer, said process characterized in treating the surface of the electrically conducting layer with a fluorine containing etching agent, said treatment being at the place provided for soldering, and soldering a foot of the current connecting element to said electrically conducting layer at said treated surface.

2. The process of claim 1 wherein the fluorine containing etching agent is an aqueous solution of an acid fluoride.

3. The process of claim 2 wherein the aqueous solution of an acid fluoride is one of an alkali hydrogen fluoride and an ammonium hydrogen fluoride.

4. The process of claim 3 wherein the aqueous solution of an acid fluoride comprises an approximately 10% aqueous solution of ammonium fluoride.

5. The process of one of the claims 1 to 4 wherein a stamp is wetted or saturated with the fluorine containing etching agent.

6. The process of claim 5 wherein said enamel-like electrically conducting layer comprises a current feed conductor of an electrically heatable glass pane.

* * * * *